3,307,025
ENCODING APPARATUS
John Scarbrough, Palo Alto, and Harold E. Sweeney, Menlo Park, Calif., and Rolf D. Kahle, Chicago, Ill., assignors to General Precision, Inc., Binghamton, N.Y., a corporation of Delaware
Filed Sept. 4, 1963, Ser. No. 306,551
10 Claims. (Cl. 235—160)

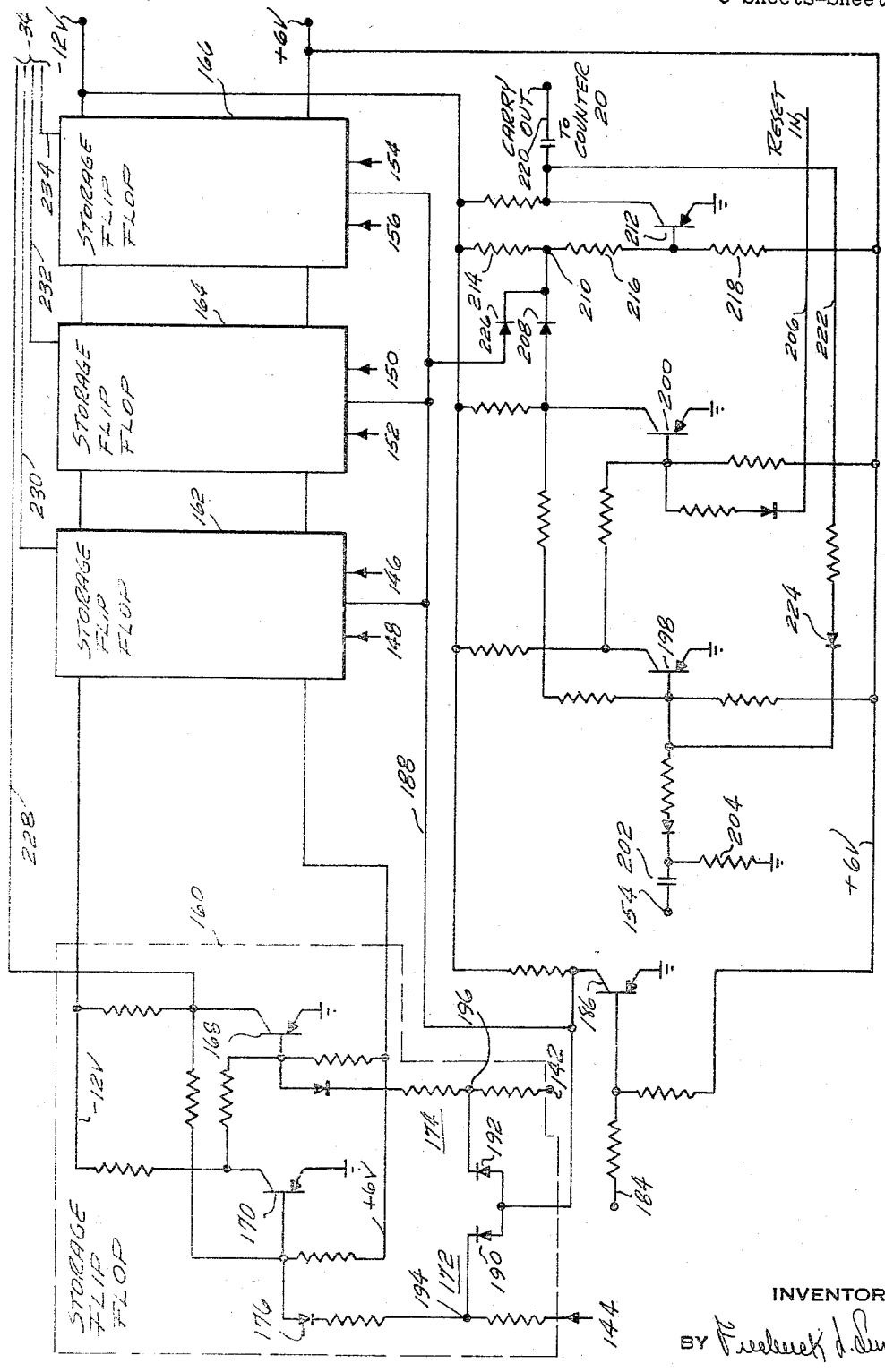

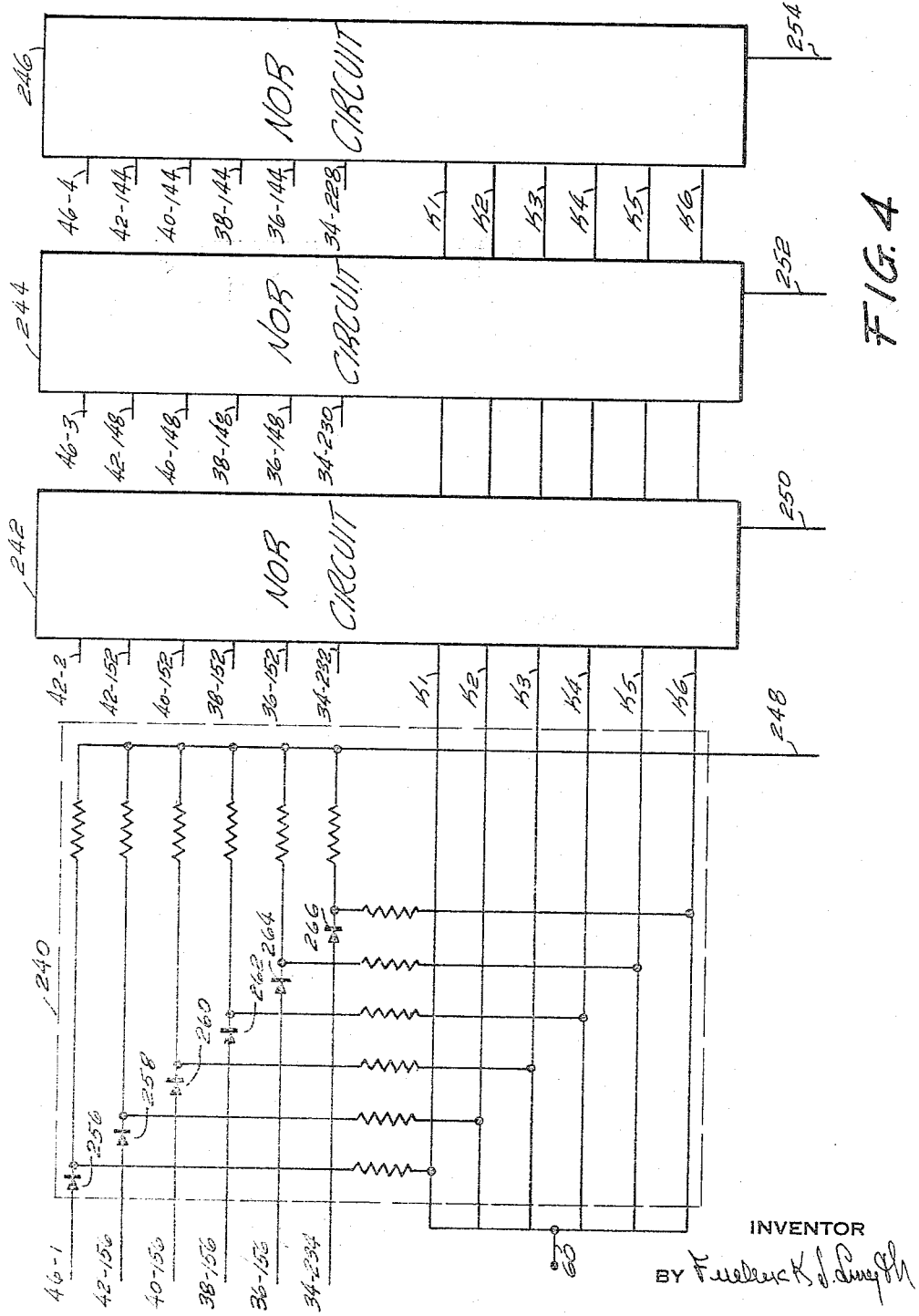

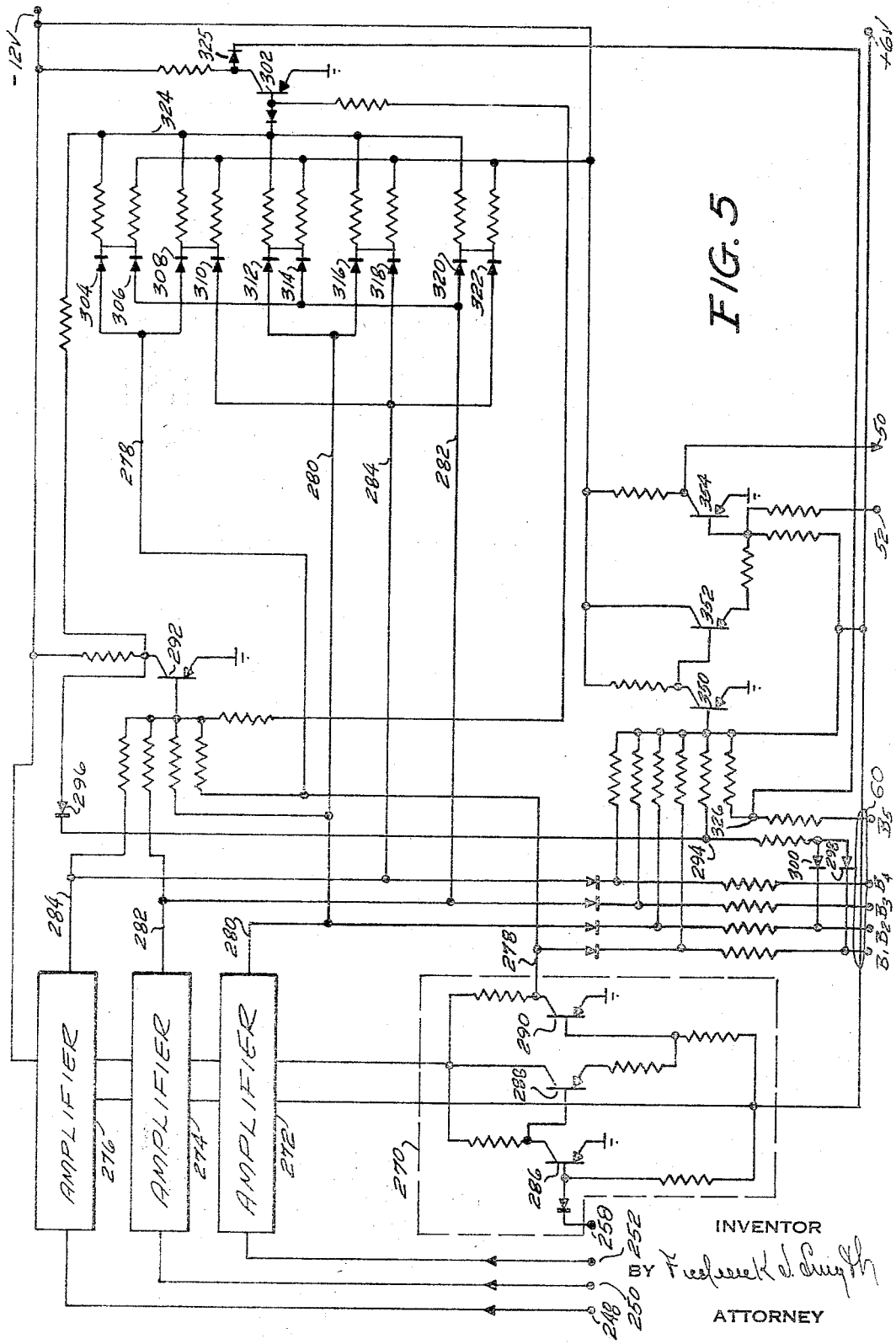

This invention relates to an encoding apparatus, and more particularly to an improved electronic data encoding apparatus operable to continuously accept successive input signals at a random repetition rate, and to selectively provide a plurality of serial output signals, properly modified, in a predetermined information code sequence.

In a variety of industrial control systems, it is often necessary to accurately measure selected system conditions and parameters such as, by way of example, a fluid flow rate, and thereafter to transmit data representative of such measurements to a centrally located station whereat such measurements are indicated, monitored, and/or recorded. Further, when commercial transactions, such as invoicing and the like, are controlled by a computer installed at the central station, it is obviously necessary that the data transmitted to the computer be extremely accurate. For the reason that positive displacement flow-measuring devices, generally, are more accurate than other types, they usually are used in flow-measuring systems wherein extreme accuracy is required. Elementary forms of positive displacement, or "PD," flowmeters comprise either simple reciprocating piston fluid motors or rotary vane fluid motors, with electrical contacts arranged to operate each time the piston reciprocates or each time the rotary vane turns through a given angle. In this manner, an electrical circuit connected to the contact receives pulse signals at a random repetition rate, the particular repetition rate during any time interval being indicative of the flow rate during this time interval, and the number of pulses received by the circuit during the time interval being indicative of the quality of fluid that has passed through the meter.

As will be understood by those skilled in the art, flowmeters of the above-described type, that is, those which provide pulse output signals, are selected when it is necessary to transmit the data derived therefrom over a considerable distance, rather than flowmeters which provide an analog output signal, in order to avoid the possible introduction of errors as a result of voltage drops along the transmission system.

In general, the computer installed at the central station, to receive the data transmitted from one or more flowmeters, is of the digital type, having a predetermined coding scheme and stored program operations, in which various computations are performed during successive machine clock periods. For this reason, the random repetition rate provided by a flowmeter cannot directly be employed as input data for the digital encoder, but first must be encoded into digital numbers in a binary code compatible with the particular computer installed at the centdal station.

Further, in order to transmit a wide range of flow rates accurately, a large number of data bits are obviously required in the digital signals representing the flow rates. Additionally, for economic reasons, it is preferable to utilize a minimum number of transmission channels, or wires, between the encoder and the central computer, resulting in that the output data from the encoder be transmitted in serial form to the computer.

The problem of accurately converting the random repetition rate pulse signals provided by the flowmeter into digital signals, in the binary code accepted by the computer, is complicated by the fact that the flow rate being measured is completely independent of the computer program, resulting in that the flow data may be required by the computer during time intervals when the rate of fluid flow is relatively large, or, alternatively, during time intervals when the rate of fluid flow is zero. If the rate of fluid flow is large, at the time the flow data is required by the computer, an encoder, to be acceptable, must continue to receive and accumulate the pulse signals provided by the flowmeter, while simultaneously, the data being transmitted to the central computer must remain independent of the signals arriving at the encoder during the transmission time interval, in order to avoid the possibility of drastic errors being introduced into the transmitted data.

This latter feature may best be understood by considering a specific example. Remembering now, that data is generally transmitted from the encoder in serial form, and, assuming that the digital number is transmitted in descending order of significant bits, a count of 09999 could be erroneously transmitted as 00000, if a single input pulse were applied to the encoder effective to change the count to 10000, during the time interval that the most significant digit was being encoded, unless, of course, the transmitting portion of the encoder operates independently of the receiving portion during a transmission time interval.

Accordingly, there is provided by the present invention, an improved encoding apparatus which operates in a novel and efficient manner to furnish all of the above-listed features, as well as several others, such as, by way of example, a function character at the start of a transmission message to identify the type of data to be transmitted, plus an end-of-message code character. Briefly, the encoder, a preferred embodiment of which is hereinafter described in detail, includes a five stage decimal counter operable to count and accumulate the pulse signals provided by the flowmeter. For the reason that a high degree of accuracy is ensured by transmitting digital data in a two-out-of-five check code, yet the counter design is simplified if each decade of the counter stores data in a conventional binary code, a parity bit generator is employed to convert the four bit binary code in each decade into the desired two-out-of-five code. Further, since the selected check code is the 74210 parity check code, each digit in the counter is stored in the 7421 binary weighted code rather than the standard 8421 code, and novel circuitry is included in each counter stage in order that no more than two binary bits are in the 1 state for each number stored, and to reset the stage to zero upon the reception of the next pulse when the value time nine is stored therein.

Additionally, to provide for readout of the data stored in the counter, independent of the continuation of the application of one or more input signals thereto during the readout time interval, a separate storage stage is included which normally is slaved to the immediately preceding counter stage. During a readout operation, however, the count in the storage stage is prevented from changing, even though the count in the preceding stage is changing, as a result of the application of one or more pulse signals to the counter by the flowmeter. Finally, novel scanning circuits are provided effective not only to serially furnish the required data, but also to convert the count stored in the counter into the two-out-of-five check code, all as more particularly hereinafter described.

It is an object of the invention, therefore, to provide an encoding apparatus.

Another object of the invention is to provide an improved electronic data encoding apparatus.

Yet another object of the invention is to provide an improved encoding apparatus operable to continuously accept successive input signals at a random repetition rate and to selectively provide a plurality of serial output signals, properly modified, in a predetermined information code sequence.

Still another object of the invention is to provide an improved encoder operable in conjunction with a positive displacement flowmeter to furnish digital data representative of the accumulated flowmeter measurements.

A further object of the invention is to provide an improved encoder including a parity bit generator to convert the four bit binary code employed in the counter into a two-out-of-five output code.

A related object of the invention is to provide novel scanning circuitry to serially read out data from a decade counter.

Still another object of the invention is to provide improved and efficient circuitry for selectively isolating the receiving portion of a data encoder from the transmitting portion thereof.

Yet another object of the invention is to provide an improved encoder including a decade counter operable to store information in the 7421 binary code.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 3 is an electrical schematic diagram partly in block form of the units storage stage illustrated in FIG. 1.

FIG. 4 is an electrical schematic diagram partly in block form of the digit scanner illustrated in FIG. 1.

FIG. 5 is an electrical schematic diagram partly in block form of the output scanner and parity bit generator illustrated in FIG. 1.

Although the apparatus of the present invention exhibits general utility, it is particularly adapted to systems such as that disclosed in copending application Serial No. 100,920, filed April 5, 1961, on behalf of Bernard T. Wilson et al. and assigned to the assignee of this invention. As there described, a telemetry data logging system is provided including a central station and one or more remote addressable field stations. Each field station has provisions for measuring and monitoring selected parameters, and for controlling several of the instruments and devices installed thereat. Upon command from the central station, the addressed field station provides digital data, in the two-out-of-five check code in one specific embodiment, representative of various measurements as well as the position of several controls.

For the reasons enumerated above, such as the random repetition rate and the problem of simultaneously receiving and transmitting data, it is necessary that encoding apparatuses be included at each field station in order to accurately transmit data representative of the measurements provided by flowmeters and the like. As will be understood as the description proceeds, the apparatus of the invention has primary utility in such large scale systems.

Figure 1:
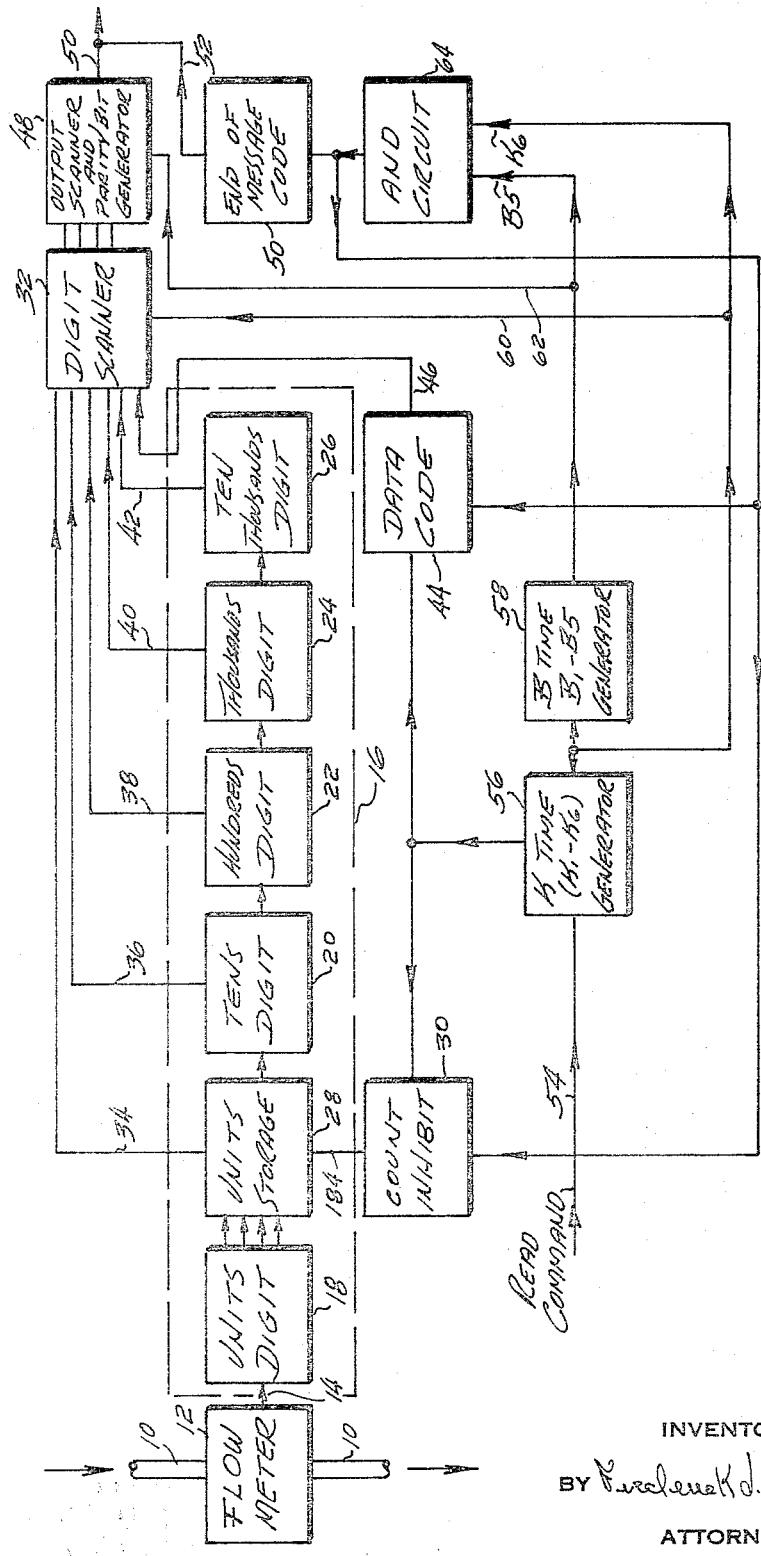
FIG. 1 is a block diagram of a preferred embodiment of the encoding apparatus of the invention.

Referring now to the drawings, FIG. 1 illustrates a preferred embodiment of the invention in block diagram form. As there shown, the quantity of fluid passing through a conduit 10 is measured by a positive displacement flowmeter 12, meter 12 providing a sequence of output pulses along a line 14, the repetition rate of which is proportional to the rate of flow of the fluid through conduit 10. Flowmeter 12 is selected from any of the number of known positive displacement-type flowmeters, and is operable to provide a pulse signal on line 14, which is indicative of a predetermined quantity of fluid passing through meter 12. By way of example, if the flow rate through conduit 10 is zero, no pulses, of course appear along line 14. Alternatively, when the flow rate is a maximum, the number of pulses appearing on line 14 per unit time interval, which, in a typical system corresponds to a repetition rate of 100 p.p.s., is also a maximum. Further, for other flow rates, the repetition rate will lie between the limits of 0 and 100 p.p.s.

Figure 2:
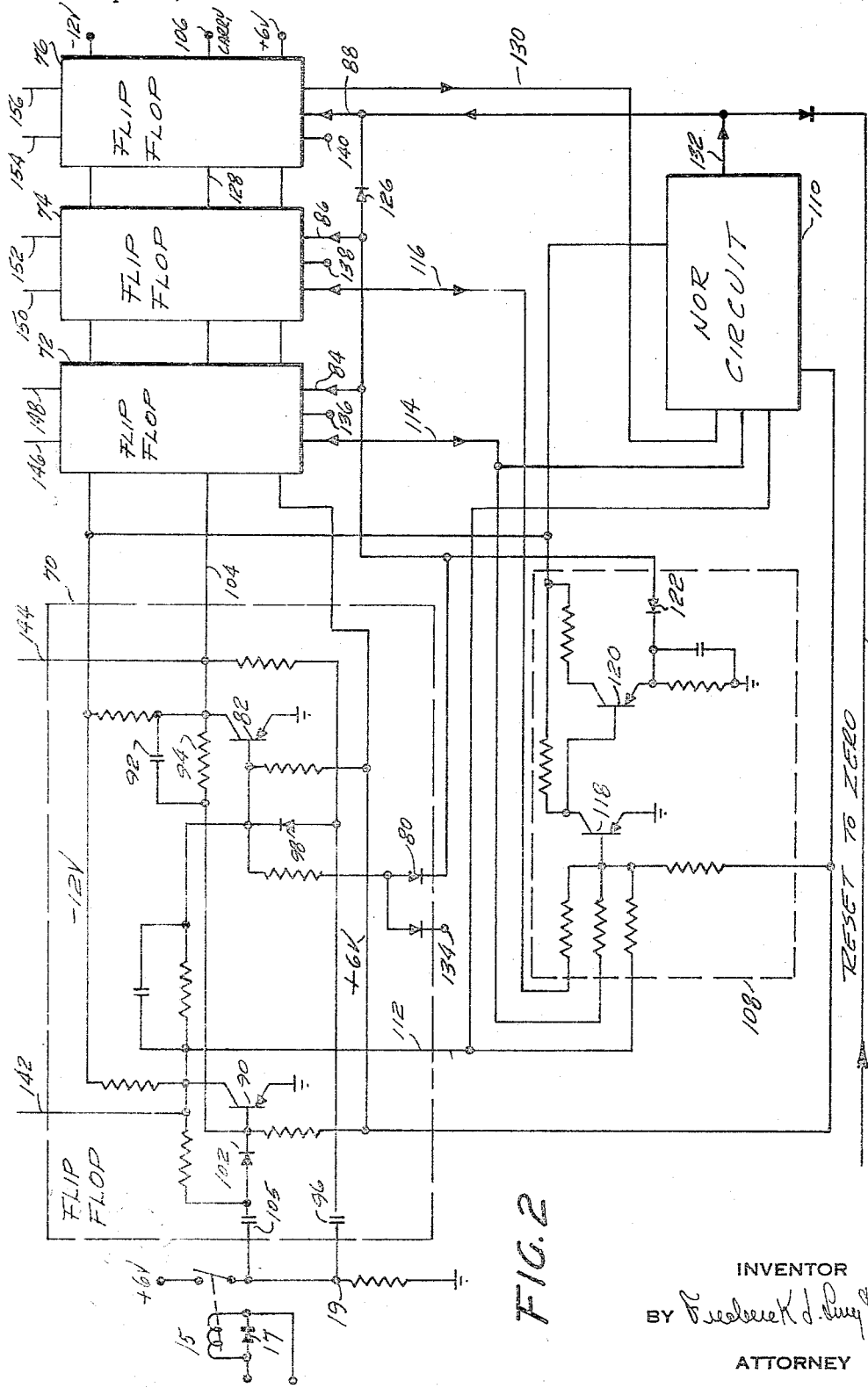
FIG. 2 is an electrical schematic diagram partly in block form of a counter stage of the apparatus illustrated in FIG. 1.

Referring to FIGURE 2, a relay 15 is coupled to receive pulses from flowmeter 12 via terminals 14. The flowmeter, the winding of the relay 15, and the leads coupling between the flowmeter and the relay, generally, are highly inductive in character, such that a substantial transient time will be required for establishing current flow, and sharp pulses may not be directly obtainable from the flowmeter. Relay 15 is responsive to current flow from the flowmeter, and operates to provide the desired sharp pulses upon closure of the switch contacts thereof. A diode 17 is coupled across the relay coil to provide a path for transient current flow when the inductive circuit of the relay winding is interrupted. Normally with relay 15 open, a point 19 is at ground potential, because of a coupling resistor 21. Upon closure of relay 15, a positive 6 volts is applied directly to point 19 and to the decade counter 16 (FIG. 1). Thus, it should be understood that relay 15 is responsive to the signals provided from flowmeter 12, and is operable to generate sharp pulses which are received by the first stage of the counter 16.

The pulses applied at point 19 are next fed to a decade counter unit 16, which comprises conventional decade counting stages 18, 20, 22, 24, and 26 as well as a units storage stage 28. Each of the counting stages is operable to count from 0 through 9, and, upon being reset to 0 in response to the next applied pulse, to provide a carry signal to the next succeeding stage. Further, the five counting stages, in combination, are effective to count and accumulate a maximum count of 99999.

Units storage stage 28, included in counter 16, is normally slaved to the count stored in units digit 18, that is, the count stored in storage unit 28 is exactly the same as the count present in units digit 18. However, as will be more particularly hereinafter explained, during a readout operation, the count in storage unit 28 is "frozen," or prevented from changing, under control of a count inhibit circuit 30, even though additional pulses are supplied by line 14, and the point 19, to units digit 18 effective to change the count therein. Then, at the termination of a readout operation, inhibit circuit 30 is deactivated, and the count in storage unit 28 is automatically caused to assume the count present at that instant in units digit 18. Further, storage device 28 is responsive to whether or not a carry pulse was generated by units digit 18 during the read operation so that the count now stored in storage device 28 and decades 20, 22, 24, and 26 is exactly the same as the count stored in decades 18, 20, 22, 24, and 26, including those pulses provided by meter 12 during the read operation. In this manner, storage device 28 is operable to isolate counter 16 from meter 12 during an encoding cycle to prevent the possibility of errors being introduced in the digital output signal, yet, additionally, ensures that no input pulses remain uncounted, which, of course, would also result in an erroneous output signal.

During a readout operation, the count stored in storage device 28, and decade counting stages 20, 22, 24, and 26 are sequentially scanned by a digit scanner 32, scanner 32 being coupled to the various stages by multiconductor cables 34, 36, 38, 40, and 42. The output of a data code generator 44, which is generally preset in the encoder, is also coupled to digit scanner 32 along a multi-digit cable 46 to provide a digital output signal at the start of a transmission message to thereby identify the type of data to be transmitted. As each decade, or the output of data code generator 44, is selected by digit scanner 32, the outputs of the storage devices in the selected units are sequentially scanned by an output scanner 48. Scanner 48 is additionally effective to automatically convert the 7421 code in which the data is stored in each unit into the desired two-out-of-five output code. The comparison between the 7421 code and the two-out-of-five code is indicated in Table I.

TABLE I

| Decimal Value | 7421 Code Weighted Values | | | | Two-Out-Of-Five-Code Weighted Values | | | | |
|---|---|---|---|---|---|---|---|---|---|
| | 7 | 4 | 2 | 1 | 7 | 4 | 2 | 1 | 0 |
| 0 | 0 | 0 | 0 | 0 | 1 | 1 | 0 | 0 | 0 |
| 1 | 0 | 0 | 0 | 1 | 0 | 0 | 0 | 1 | 1 |
| 2 | 0 | 0 | 1 | 0 | 0 | 0 | 1 | 0 | 1 |
| 3 | 0 | 0 | 1 | 1 | 0 | 0 | 1 | 1 | 0 |
| 4 | 0 | 1 | 0 | 0 | 0 | 1 | 0 | 0 | 1 |
| 5 | 0 | 1 | 0 | 1 | 0 | 1 | 0 | 1 | 0 |
| 6 | 0 | 1 | 1 | 0 | 0 | 1 | 1 | 0 | 0 |
| 7 | 1 | 0 | 0 | 0 | 1 | 0 | 0 | 0 | 1 |
| 8 | 1 | 0 | 0 | 1 | 1 | 0 | 0 | 1 | 0 |
| 9 | 1 | 0 | 1 | 0 | 1 | 0 | 1 | 0 | 0 |

Additionally, an end of code generator 50 is provided, which is coupled to a line 52, from output scanner 48, by means of a line 54, and is selectively operable to furnish a digital encoded signal representative of the end of a readout operation. It should now be apparent that the output signal provided by line 50 during a conversion operation consists of seven character groups, a function character, followed by five digits of the stored count, plus an end of message character, the details of the necessary specific circuits being hereinafter more particularly described.

As also indicated in FIG. 1, the initiation of a conversion operation is commenced by the application of a read command signal, from the central station, along a line 54. The read command signal is effective to start a K time generator 56 which is operable, in the specific embodiment of the invention now being described, in response to such a signal to define a total of six equal length time intervals hereinafter denoted as $K_1$ through $K_6$. Coupled to a first output of K time generator 56 is a B time generator 58 which subdivides each K time interval into five B time intervals $B_1$ through $B_5$. The outputs of generator 56, coupled to digit scanner 32 by a multiconductor cable 60, and of generator 58, coupled to output scanner 48 by another multi-conductor cable 62, together provide the necessary timing signals to develop the output information code sequence. Further, the initiation of a $K_1$ time interval, provides, from a second output of generator 56, the proper signals to energize count inhibit circuit 30 and data code generator 44. Additionally, the simultaneous occurrence of a $K_6$ time interval and a $B_5$ time interval is sensed by an AND circuit 64, which is thereafter effective, after a predetermined time delay, to operate end of message code generator 50, as well as to deenergize count inhibit generator 30 and data code generator 44, all as will better be understood as the description proceeds.

Each of the decade counters of the invention, 18, 20, 22, 24, and 26 illustrated in block form in FIG. 1, may be selected from any of a variety of well known circuits. However, a preferred embodiment of each of the counter stages, specifically adapted to store the binary information in the 7421 weighted code, is illustrated in FIG. 2. As there shown, a counter stage includes four serially connected flip-flops 70, 72, 74, and 76, the first of which, only, is shown in schematical form, the remaining flip-flops being indicated by the identified blocks. Considering, now, the circuit of FIG. 2 to be that of units digit stage 18, it being remembered that each of the remaining decade stages are identical, with the exception that relay 15 is only required in counter 18, all of the flip-flops are initially reset to the binary zero state under control of a reset to zero pulse applied along a line 78. This negative reset pulse is parallelly applied through a diode 80 to the base of a transistor 82 of flip-flop 70, as well as to similar circuitry coupled to lines 84, 86, and 88 of flip-flops 72, 74, and 76, respectively. Since all of the flip-flops are identical, the corresponding circuitry in the flip-flops shown in block form will not hereinafter be specifically referred to unless necessary.

The negative reset pulse applied to the base of transistor 82 is effective to ensure the conduction thereof, and the collector potential, which is now essentially ground, is coupled to the base of a complementary transistor 90 by a capacitor 92 and a resistor 94 to switch, or maintain, as the case may be, transistor 90 nonconductive, thereby resetting the flip-flop to the zero state. Next, positive pulses from flowmeter 10, supplied along line 14, are alternatively effective to change the conduction states of transistors 82 and 90, in conventional flip-flop fashion, through a capacitor 96 and a first steering diode 98 and a capacitor 100 and a second steering diode 102. Note that the second pulse provided by line 14, as well as each subsequent even numbered pulse, is effective to switch transistor 82 from the nonconducting to the conducting state, thereby raising the level of the collector from minus twelve volts to approximately ground potential. This positive-going waveform is coupled along a line 104 to the input of flip flop 72, to further control the conduction state of the transistors therein. Thus, it should be understood that flip-flops 70, 72, 74, and 76 in combination provide a counter, which, of and by itself, is normally operable to count and accumulate a maximum of fifteen pulses, resetting to zero and providing a carry pulse along a line 106 upon the receipt of a sixteenth pulse.

However, as stated above, it is desired that decade counters be employed, that is, each counter stage provide a carry pulse upon the application of the tenth received pulse, and, further, that the binary information be stored in each stage in the 7421 weighted code as shown in Table I. Each of these features is attained in the circuit of FIG. 2 through the addition of a pair of similar negative OR, or NOR, circuits 108 and 110, NOR circuit 108, only, being illustrated in complete schematic detail. Note should be made of the fact, and this is an important feature of this portion of the invention, that, rather than generating a sequence of feedback pulses and applying these pulses to particular stages of the counter to accomplish the decimal counting function by means of complex circuitry, only a pair of relatively simple NOR logic circuits are sufficient to accomplish both the demical counting function as well as converting from the standard 8421 weighted code to the desired 7421 weighted code.

Referring now to Table I, and remembering that flip-flop 70 is the stage of weight 1 and flip-flop 76 is the stage of weight 7, it can be seen that the receipt of pulse number 7 results in the following divergence between the normal and desired flip-flop states:

| Pulse Number | Normal State of Flip-flop No. | | | | Desired State of Flip-flop No. | | | |
|---|---|---|---|---|---|---|---|---|
| | 70 | 72 | 74 | 76 | 70 | 72 | 74 | 76 |
| 6 | 0 | 1 | 1 | 0 | 0 | 1 | 1 | 0 |
| 7 | 1 | 1 | 1 | 0 | 0 | 0 | 0 | 1 |

Referring now again to FIG. 2, note that an output of flip-flops 70, 72, 74 is coupled by lines 112, 114, and 116 in parallel to the base of a normally conducting transistor 118 of NOR circuit 108, in such manner that when each of these flip-flops is in the 1 state, which uniquely defines the digit seven in the undesired 8421 code, essentially ground potential is present on lines 112, 114, and 116. Therefore, the combination of potentials applied to the base of transistor 118 is effective to cut off this transistor, causing the collector thereof to fall to the minus twelve volt level. This negative-going waveform is coupled by an emitter-follower 120 and a diode 122 to a line 124 which, in conjunction with line 78 is connected to the reset inputs of flip-flops 70, 72, and 74, and isolated from the reset input of flip-flop 76 by a diode 126. Thus, the application of a seventh input pulse along line 14 normally sets flip-flops 70, 72, 74 and 76 in the 1110 sequence, which condition is sensed by NOR circuit 108. NOR circuit 108 then resets flip-flops 70, 72, and 74 to the 0 state, the resetting of flip-flop 74 providing a carry pulse along a line 128 effective to set flip-flop 76 to the 1 state. Thus, the application of a seventh input pulse to the circuit of FIG. 2 results in the desired weighted sequence 0001 indicative of the digit seven being attained.

Next, in a similar manner, NOR circuit 110 is operable, when a tenth input pulse is received, to reset all of the flip-flops to the 0 state. As indicated in Table I, flip-flops 70 through 76 store the digit nine in the sequence 0101, and thus the next pulse results in the sequence 1101 being stored in the circuit of FIG. 2. However, this unique sequence is sensed by NOR circuit 110 through lines 112, 114, and 130 connected to flip-flops 70, 72, and 76, respectively, which thereupon provides a reset signal on a line 132 which is further connected to reset line 78.

Finally, it should be noted that individual reset terminals 134, 136, 138, and 140 are provided for flip-flops 70 through 76 in order that other and different desired counting sequences than that specifically illustrated immediately above may readily be provided. Additionally, complimentary output lines are provided from each flip-flop, indicated as 142, 144, 146, 148, 150, 152, 154, and 156, lines 144, 148, 152, and 156 combining to form multiconductor cables 36, 38, 40, and 42 (see FIG. 1) depending, of course, on the particular counting stage being connected to digit scanner 32.

Referring now to FIG. 3 there is illustrated a schematic diagram of units storage stage 28, which is next described in the manner used in the description of FIG. 2, that is, one of a number of similar circuits only will be discussed in detail. As shown in FIG. 3, four separate flip-flops are employed to store the information present in units digit stage 18, the state of each flip-flop being slaved to a corresponding flip-flop of stage 18 by means of the complementary output lines therefrom. Note that output lines 142 and 144 of flip-flop 70 (see FIG. 2) are coupled to the bases of a pair of cross-coupled transistors 168 and 170 through one input of a further pair of AND circuits, generally indicated as 172 and 174 and more particularly hereinafter described, and diodes 176 and 178. Thus, by way of example, when transistor 82 is conducting, indicating that flip-flop 70 is in the 0 state, line 142 is at a potential of minus twelve volts, thereby forcing transistor 168 of flip-flop 160 also to conduct, and placing flip-flop 160 also in the 0 state. Similarly, a negative potential on line 144, resulting from flip-flop 70 being in the 1 state, forces transistor 170 to conduct and switch flip-flop 160 to the 1 state. It can be seen, therefore, that each of the flip-flops of units storage stage 28 normally assumes the state of the flip-flop, in units digit counter 18, with which it is associated.

As stated above, an encoder, in order to be operable for the purposes here intended, must isolate the receiving portion of the circuitry from the transmitting portion thereof. This feature is provided by storage stage 28, upon the application of an inhibit pulse from count inhibit circuit 30 along a line 184. This negative signal applied to the base of a transistor 186, operates to switch transistor 186 from the normally cut off condition into saturation, thereby raising the potential of an inhibit line 188 from minus twelve volts to essentially zero. Line 188 is coupled to a pair of AND circuits, such as 172 and 174, in the input of flip-flops 160, 162, 164, and 166, and the zero potential provided thereby, during a readout operation, is effective to freeze the state of the flip-flops, independent of whether or not the state of the associated flip-flop changes during this time interval. This occurs, as may readily be seen, since diodes 190 and 192 effectively clamp junctions 194 and 196 to ground potential, thereby preventing a negative voltage present on either of lines 142 and 144 from effecting the conduction state of transistors 168 and 170. At the end of a readout operation, the inhibit signal is removed from line 184, causing the potential of line 188 to again fall to the minus twelve volt level, removing the clamping effect of diodes 190 and 192, and allowing lines 142 and 144 to control the state of flip-flop 160. Thus, the removal of the inhibit signal provides that the flip-flops of storage unit 18 assume the state of the flip-flops of units counter 18, independent of whether or not the state of the latter changed during the readout operation.

Further, note should be made of the fact, and this is another important feature of the invention, that units digit counter 18 may possibly pass from a count of nine to a count of zero, and thus generate a carry signal, which signal must be sensed and accumulated in order that an accurate count be present in counter 16. This important feature is provided by storage unit 28 in the following simple yet effective manner.

Referring again now to Table I, it can be seen that weighted stage 7, flip-flop 76 of FIG. 2, uniquely switches from the 1 state to the 0 state only when the count in the counter changes from nine to zero, that is when a carry signal is to be generated. This information is employed by storage unit 28 to generate a carry signal for tens digit counter 20 both during normal counting intervals, and, also, at the end of a read operation only if units digit counter 18 progressed from nine to zero. Output line 154 from flip-flop 76 (see FIG. 2) is further connected to the input of another flip-flop comprised of transistors 198 and 200, through a differentiating network composed of a capacitor 202 and a resistor 204. At the beginning of a counting period, or when counter 16 is reset to zero, transistor 200 is caused to conduct by a pulse supplied by a line 206, raising the collector voltage to zero volts. A diode 208 then clamps a junction 210 to this level thereby being effective to bias off a carryout transistor 212. Next, when units counter 18 counts from nine to zero, the negative-going waveform, indicative of a carry signal, supplied along line 154 is differentiated by capacitor 202 and resistor 204 and operates to switch transistor 198 to the conducting state, and, therefore, transistor 200 to the cut-off state. As the collector voltage of transistor 200 falls to the minus twelve volt level, junction 210 becomes unclamped, and the base voltage of transistor 212, as now determined by the resistance ratios of resistors 214, 216, and 218, initiates conduction therein providing a positive carry pulse on line 220.

It should further be noted that the carry pulse is also coupled by a line 222 and an isolation diode 224 to the base of transistor 198 to reset the flip-flop to the initial state and again clamp junction 210 to ground potential. Thus, during normal counting time intervals, each carry indication provided by line 154 results in a positive output pulse on line 220.

However, as stated above, during a readout operation, no carry signals should be added to any of the stages being read, in order to eliminate the possibility of introducing drastic errors in the encoder's output. This is accomplished by a diode 226 connected between inhibit line 188 and junction 210. Remembering that, during a readout operation, line 188 is at ground potential, diode 226 is effective to clamp junction 210 to this potential and thus prevent the generation of a carry signal, independent of the potential of the collector of transistor 200. Next, at the termination of a readout operation, the effect of diode 226 upon junction 210 is removed, and the conduction state of transistor 200 alone determines whether or not a carry pulse is now generated, in the manner described above. Note, that even though a carry indication is provided along line 154 during the readout operation, no carry output pulse is generated by the circuit of FIG. 2 until the end of this operation.

In summary then, units storage device 28 operates, during normal counting intervals, to follow the count stored in units digit counter 18, as well as to couple a carry indication generated by counter 18 to counter 20. Additionally, during a readout operation, storage unit 28 isolates both the count present in counter 18, and any carry indications generated thereby from effecting the data being read out of counter 16. Further, at the end of a read operation, the count in the readout circuits in counter 16 is corrected to account for any input pulses that were coupled from flowmeter 10 along line 14 during the read operation.

FIG. 4 is a schematic diagram of digit scanner 32, again with identical portions thereof indicated in block form. As shown, the four binary output signals from storage unit 28, counters 20, 22, 24, and 26, and data code generator 44 are connected in AND gate configurations to the inputs of four NOR gates 240, 242, 244, and 246, only NOR gate 240 being illustrated in complete schematical form. An additional input to these AND gates is provided by the sequence of K time signals, K1 through K6, supplied along line 60 from K time generator 56. Remembering now that identical circuits are employed in each counter unit, the input lines from these circuits are identified in FIG. 4 by a double reference number, the first portion of which is the multiconductor cable coupling a particular counter stage to the data scanner, and the second portion thereof referring to the specific output line in FIG. 2. By way of example, input line labelled 42–156 represents output line 156 coupled from counter 26 along cable 42, input line 40–156 represents output line 156 coupled from counter 24 along cable 40, etc. A similar reference numeral system is employed for the outputs from storage circuit 28 along cable 34, and, finally, the outputs from data code generator 44 along cable 46 are differentiated by the reference numerals 1 through 4, data generator 44 comprising a group of selectively energized and deenergized transistor stages, or similar circuits.

As shown, each of the four NOR gates are connected to be controlled by the K timing signals successively supplied on the six control lines of multiconductor cable 60. It should be understood, that only one of these control lines is energized during each K-time interval, and when a given control line is energized, it is effective to provide a representation of the state of the four flip-flops of the stage being sampled, along output lines 248, 250, 252, and 254. Normally, each of the K control lines are positive, thereby isolating all of the flip-flop output lines from the NOR gate output lines by means of diodes 256, 258, 260, 262, 264, and 266. Next, during a K2 time interval, by way of example, however, the K2 control line goes negative, and couples input line 42-156 to output line 248, input line 42–152 to output line 250, and input lines 42–148 and 42–144 to output lines 252 and 254, respectively. Thus, it will be seen that energization of a given one of the K control lines provides a signal on the output lines of NOR gates 240, 242, 244, and 246 representative of the state of the four flip-flops of the stage being sampled, and as the K control lines are successively energized with a negative potential, successive four bit parallel signals are provided indicative of the number stored in the stage being sampled. Further, although the circuit shown in FIG. 4 samples the data in a sequence arranged in the order of descending significant bits, it is deemed obvious that either the order of the K control signals, or the counter input connections, could be reversed in order to obtain a sequence arranged in the order of ascending significant bits.

In order to transmit data from the encoder serially over a single line to the central station, the four output lines of data scanner 32 must be scanned sequentially, and, also, in order that the counter 7421 weighted code be acceptable to the computer installed at the central station, the 7421 code must be first converted to the 74210 two-out-of-five codes. Both of these functions are performed in output scanner 48, a schematic diagram of which is illustrated in FIG. 5.

As shown in FIG. 5, the output lines of data scanner 32, lines 248, 250, 252, and 254, are each coupled to one of a group of amplifiers 270, 272, 274, 276. The output of which appears on a corresponding one of lines 278, 280, 282, and 284. It can be seen, from the interconnection of transistors 286, 288, and 290 of amplifier 270, by way of example, that the polarity of the output of each of the amplifiers corresponds to the polarity of the input signal, that is, a negative (binary 1) input provides a negative output, and a relative positive (ground potential corresponding to a binary 0) provides a relative positive output.

The output of amplifiers 270, 272, 274, and 276 are successively scanned by the B1 through B4 timing pulses provided by B time generator 58 along multiconductor 62, it being understood that all of the B time pulses, B1 through B5, occur during each of the K time intervals. In a manner analogous to that employed in data scanner 48, each of the B control lines are normally positive, successively being energized in sequence to provide the desired scanning.

For example, if during B1 time, output line 278 of amplifier 270 is relatively positive, this potential is applied to the base of a transistor 350, and since at this time all the other potentials applied to transistor 350 are also relatively positive, as will be understood as the description proceeds, transistor 350 remains cut off, and the transistors serially coupled thereto, 352, and 354, remain conducting, thereby providing a relatively positive signal on output line 50. If, however, line 278 is negative during B1 time, a negative signal is applied to the base of transistor 350, and this single negative signal, of and by itself, is sufficient to switch transistor 350 to the conducting state, and thus develop a negative output potential on line 50. It should now be understood that the binary data parallelly applied on lines 248, 250, 252, and 254 is serially presented on output line 50 by the successive energization of the B1 through B4 control lines.

Referring again now to Table I, it is noted that the desired two-out-of-five check code, requires that the decimal value zero be indicated by the binary 11000 in the weighted 74210 code. This feature is attained in the circuit of FIG. 5 in the following novel manner, remembering first that, as stated above, the output data is represented in descending order of significant bits. Therefore, for this reason, B1 time corresponds to the weighted value 7, B2 time corresponds to the weighted value 4, etc. Thus, it is requird that a binary 1 appear on output line 50 during B1 and B2 time, when all of the input lines simultaneously represent a binary 0, that is, a decimal value of zero.

Amplifier output lines 278, 280, 282, and 284, are additionally coupled in parallel to the base of a transistor 292. It can be seen that a K time interval when all of these lines are relatively positive, corresponding to a decimal zero in the 7421 code, transistor 292 is cut off, and its collector falls to a minus twelve volts. This potential is blocked from appearing at a junction 294 by a diode 296. Now, the energization of the B1 control line by a negative potential, is coupled to the base of transistor 350, by a diode 298, which is turned on thereby providing a negative potential (binary 1) on output line 50. Similarly, the energization of the B2 control line is coupled to the base of transistor 350 through a diode 300 to also generate a binary 1 indication during this B time interval. However, note that during other K time intervals when one or more of the input lines represent a binary 1, that is a decimal value other than zero, at least one negative potential is applied to the base of transistor 292 raising its collector potential to the relative positive, or ground, potential, and during this time interval, diode 296 is effective to clamp junction 294 to this potential, preventing the B1 and B2 control lines from, by themselves, altering the conduction state of transistor 350. Thus, under control of transistor 292, the B1 and B2 control signals are employed to provide the binary 1 output signals during the weighted 7 and 4 scanning time intervals, when the decimal value of the digit being scanned is zero.

Finally, it is necessary to generate a parity bit, when one and only one of the input lines is in the binary one state, corresponding to the decimal values 7, 4, 2, and 1. The parity bit is generated, if necessary, but transistor 302 and five AND circuits including diode pairs 304–306, 308–310, 312–314, 316–318, and 320–322. Note that these diodes are connected to the combinations representing the decimal values for which no parity bit should be generated. By way of example, diode 304 is connected to line 278 representing the binary value of the weighted 7 bit, and diode 306 is connected to line 282 representing the weighted 2 bit, the combination for the decimal value nine, diode 308 is also connected to line 278 and diode 310 is connected to line 284 representing the weighted 1 bit, the combination for the decimal value eight, and continuing for the decimal values six, five, and three.

Now, during a particular K time interval, if a decimal seven, four, two or one is being scanned, transistor 302 is rendered nonconducting. This occurs, since only one of lines 278, 280, 282, and 284 is at a negative potential, allowing at least one diode of each AND circuit to remain in the low impedance state, and, further, the collector of transistor 292, as hereinbefore stated, is at the relative positive potential. This combination maintains a line 324 positive and transistor 302 cutoff. Thus, the energization of the B5 control lines applies a negative potential to the base of transistor 350 to generate a binary 1 signal on line 50.

However, when a decimal 3, 5, 6, 8 or 9 is being scanned during another time interval both diodes in the corresponding AND circuit are blocked, allowing line 324 to fall to a negative potential and switching transistor 302 to the conduction state. A diode 325 therefore clamps a junction 326 to essentially ground potential, preventing the energization of the B5 line from generating a binary 1 signal. Further, no parity bit is generated when a decimal zero is being scanned, since, during this time, the collector of transistor 292 is at a negative potential and thereby maintaining transistor 302 conducting, independent of the above described AND circuits.

What has been disclosed, is an improved electronic encoder operable to count and accumulate input pulses received at a random rate. The accumulated data is then serially read out during a selected time period, wherein the data being read out is prevented from changing during this period, yet further data is continued to be received and counted. Finally, provisions are included to convert the accumulated data into a predetermined code sequence, all as above described.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. An encoding apparatus comprising,
    (a) a source of data signals occurring at a random rate;
    (b) means for counting said signals including a plurality of serially connected decade counting stages and a storage stage, said storage stage connected between the first and second of said counting stages and normally operable to store data corresponding to the count in said first counting stage;
    (c) means coupled to said storage stage and all but the first of said counting stages for selectively scanning during a readout operation data accumulated in said coupled stages and providing data signals in a predetermined code sequence representative of the data scanned;
    (d) inhibiting means operable during said readout operation coupled to said storage stage for preventing data stored therein from changing in order that the data being scanned remain invariant;
    (e) said first stage being responsive to said source during both a readout and a non-readout operation; and
    (f) means included in said storage stage for rendering at the termination of a readout operation the accumulated count in said storage stage and said all but first counting stages equal to the total number of signals received by said encoder.

2. The apparatus of claim 1 wherein each of said decade counting stages includes,
    (a) four serially connected flip-flops;
    (b) first NOR circuit means responsive to the seventh applied signal to advance the count in said stage by one; and
    (c) second NOR circuit means responsive to the tenth applied signal to reduce the count in said stage to zero.

3. The apparatus of claim 2 wherein each of said decade counting stages count in the 7421 weighted binary code and said predetermined code sequence is the 74210 weighted two-out-of-five check code.

4. The apparatus of claim 2 wherein said storage stage includes,
    (a) four flip-flops;
    (b) first circuit means normally coupling each of said flip-flops to a corresponding flip-flop of said first decade counting stage;
    (c) second circuit means normally responsive to said second NOR circuit means of said first decade counting stage for providing a carry signal to said second decade counting stage;
    (d) each of said first and second circuit means being decoupled from said first decade counting stage by said inhibiting means; and
    (e) said second circuit means further operable at the termination of said readout operation to provide a carry signal to said second decade counting stage should said second NOR circuit means have reduced the count in said first decade counting stage to zero during said readout operation.

5. An encoding apparatus comprising,
    (a) counter means for counting data received by said encoder at a random rate, said counter means including a plurality of serially connected decimal stages and a storage stage serially connected between at least one preceding decimal stage and a succeeding decimal stage normally slaved to the immediately preceding stage;
    (b) scanning means selectively coupled to said storage stage and to all of said decimal stages succeeding said storage stage operable during a readout operation to provide output data signals in a predetermined code sequence representative of the data in said counter means; and
    (c) inhibiting means coupled to said storage means operable only during said readout operation to prevent data stored therein from changing in order that said scanned data remain invariant, said at least one stage operable during said readout operation to receive and count said input signals.

6. The apparatus of claim 5 including,
(a) a first timing generator for providing a first succession of time intervals;
(b) a second timing generator responsive to said first timing generator for providing a second succession of time intervals during each of said first succession of time intervals,
(c) said scanning means including first circuit means responsive to said first timing generator for successively providing a plurality of parallel output signals representative of the data in said storage stage and all of said decimal stages succeeding said storage stage, and second circuit means responsive to said second timing generator for successively providing serial output data signals representative of each of said plurality of parallel output signals.

7. The apparatus of claim 6 wherein said second circuit means further includes means for converting said serial signals into a predetermined binary code.

8. The apparatus of claim 7 wherein each of said plurality of output signals is in the 7421 weighted binary code and said serial signals are in the 74210 weighted binary code.

9. An encoding apparatus comprising,
(a) a source of pulse signals representative of a measurement;
(b) a binary counter responsive to said source for counting and accumulating the number of pulse signals received from said source including first, second, third, fourth, and fifth serially connected decade counting stages and a storage stage serially connected intermediate said first and second counting stages, said storage stage normally operative to store the count accumulated in said first counting stage and to transmit to said second counting stage a carry signal generated by said first counting stage, each of said counting stages comprising four serially connected flip-flops, a first NOR circuit responsive to the seventh applied input pulse to advance the count in said stage by one and a second NOR circuit responsive to the tenth applied input pulse to reduce the count in said stage to zero and thereby provide a carry signal, said storage stage including four flip-flops whose state is normally determined by the state of corresponding flip-flops in said first counting stage and circuit means normally operable to couple said carry signal provided by said first counting stage to said second counting stage;
(c) a first timing generator for providing a first succession of time intervals;
(d) a second timing generator responsive to said first timing generator for providing a second succession of time intervals during each of said first succession of time intervals;
(e) first scanning means coupled to said storage stage and said second, third, fourth, and fifth counting stages responsive to said first timing generator for sequentially providing a plurality of parallel signals representative of the count in said storage stage and said second, third, fourth, and fifth counting stages;
(f) second scanning means coupled to said first scanning means and responsive to said second timing generator for sequentially providing in a predetermined binary code serial signals representative of each of said parallel signals;
(g) inhibiting means coupled to said storage stage and responsive to said first timing generator to prevent the count stored in said storage stage from changing and the transmittal of a carry signal during a time interval determined by said first timing generator, said storage stage operable after said time interval to transmit a carry signal generated by said first counting stage, if any, during said time interval.

10. The apparatus of claim 9 including circuit means responsive to predetermined ones of said time intervals generated by said first and second timing generators to provide an output signal.

No references cited.

MALCOLM A. MORRISON, *Primary Examiner.*

K. MILDE, *Assistant Examiner.*